US005443908A

United States Patent [19]

[11] Patent Number: 5,443,908

[45] Date of Patent: * Aug. 22, 1995

Matsushita et al.

[54] HEAT SENSITIVE RECORDING COMPOSITION AND PROCESS FOR PRODUCING SAME

[75] Inventors: Toshihiko Matsushita; Shunsuke Takahashi, both of Tokyo, Japan

[73] Assignee: Mitsubishi Paper Mills Limited, Japan

[ * ] Notice: The portion of the term of this patent subsequent to Sep. 28, 2010 has been disclaimed.

[21] Appl. No.: 135,652

[22] Filed: Oct. 14, 1993

Related U.S. Application Data

[63] Continuation of Ser. No. 755,731, Sep. 6, 1991, abandoned.

[30] Foreign Application Priority Data

| | | | |
|---|---|---|---|
| Sep. 17, 1990 | [JP] | Japan | 2-246681 |
| Sep. 17, 1990 | [JP] | Japan | 2-246682 |
| Oct. 29, 1990 | [JP] | Japan | 2-293248 |
| Feb. 4, 1991 | [JP] | Japan | 3-035418 |
| Mar. 8, 1991 | [JP] | Japan | 3-068765 |
| Apr. 1, 1991 | [JP] | Japan | 3-096298 |

[51] Int. Cl.[6] .......... B01J 13/18; B05D 7/00

[52] U.S. Cl. .......... 428/402.24; 252/600; 427/213.34; 427/213.36; 428/913; 430/138; 503/207

[58] Field of Search .......... 264/4.1, 4.7; 427/213.34, 213.36; 428/402.21, 402.24; 8/526; 503/207; 430/138, 336, 340, 964; 252/600, 962

[56] References Cited

U.S. PATENT DOCUMENTS

| | | | |
|---|---|---|---|
| 3,714,102 | 1/1973 | Reiss | 427/213.34 X |
| 3,843,384 | 10/1974 | Adachi et al. | 430/338 X |
| 4,105,823 | 8/1978 | Hasler et al. | 264/4.7 X |
| 4,197,346 | 4/1980 | Stevens | 264/4.7 X |
| 4,320,039 | 3/1982 | Morishita et al. | 430/336 X |
| 4,413,843 | 11/1983 | Iwasaki et al. | 264/87 X |
| 4,423,091 | 12/1983 | Iwasaki et al. | 427/213.34 |
| 4,425,135 | 1/1984 | Bruttel et al. | 8/526 X |
| 4,482,905 | 11/1984 | Kaneko et al. | 503/207 |
| 4,520,376 | 5/1985 | Morishita et al. | 428/402.24 X |
| 4,699,872 | 10/1987 | Robillard | 430/340 X |
| 5,098,881 | 3/1992 | Hiraishi et al. | 503/207 |
| 5,135,776 | 8/1992 | Okauchi et al. | 503/207 X |
| 5,248,555 | 9/1993 | Matsushita et al. | 428/402.24 |

FOREIGN PATENT DOCUMENTS

| | | | |
|---|---|---|---|
| 3306083 | 12/1988 | Japan | 430/964 |
| 2187297 | 9/1987 | United Kingdom | 503/207 |

OTHER PUBLICATIONS

Chemical Abstracts, vol. 101, 1984, JP 59–19, 193 (Kokai) 31 Jan. 1984.

*Primary Examiner*—Richard D. Lovering

*Attorney, Agent, or Firm*—Cushman Darby & Cushman

[57] ABSTRACT

A heat-sensitive recording composition comprising agglomerates which comprise a colorless or light-colored dye precursor, a color developer which reacts with the dye precursor upon heating to form a color, and a sensitizer and have an average diameter of 2–30 μm; and a process for producing the composition are disclosed. This heat-sensitive recording composition is excellent in heat responsiveness and high in sensitivity. From the point of image stability, the agglomerates are preferably enclosed in microcapsules together with a polymer.

13 Claims, No Drawings

HEAT SENSITIVE RECORDING COMPOSITION AND PROCESS FOR PRODUCING SAME

This is a continuation of application Ser. No. 07/755,731, filed on Sep. 6, 1991, which was abandoned upon the filing hereof.

The present invention relates to a heat-sensitive recording composition excellent in heat responsiveness and having high sensitivity, and a method for producing the composition.

Heat-sensitive recording materials generally comprise a substrate and a heat-sensitive recording layer coated thereon comprising a heat-sensitive recording composition mainly composed of a normally colorless or light colored dye precursor and a color developer which reacts with the dye precursor upon being heated to allow the dye precursor to form a color. The dye precursor and the color developer instantaneously react with each other upon being heated by a thermal head, thermal pen, laser beam and the like to form a record image. These are disclosed in Japanese Patent Kokoku Nos. 43-4160 and 45-14039, etc.

Such heat-sensitive recording materials have the advantages that record can be obtained by relatively simple devices, maintenance is easy and little noise is generated, and so on. Therefore, these materials are used in various fields such as recording instruments, facsimiles, printers, terminals of computers, labels, and automatic ticket vending machines. Especially in the field of facsimile, demand for heat-sensitive recording materials has much expanded, and that expanded demand is supported by increasing proliferation of facsimile units, especially ever compacter and lower cost units, on which thermal printing is performed at ever lower energy while recording speed has to be maintained or is required to be further raised for reducing transmission cost.

In a facsimile unit nowadays for example, transmission and printing of an original sheet of A4 size (210 mm×297 mm) is performed within a few—20 seconds. This means that thermal heads in the unit have current repeatedly for a very short period of time less than a few msec. and the heat energy generated thereby is transferred to the heat-sensitive recording sheet to effect image (color) formation reaction.

In order to carry out the image formation reaction by the heat energy transferred in such a short period of time, the heat-sensitive recording material must show excellent heat response. In order to improve the heat response, compatibility between the dye precursor and the color developer must be improved. A sensitizer is used as an aid for improving the compatibility. The sensitzer melts first by itself upon heating and has an action to promote color formation reaction by dissolving or dispersing the dye precursor and the color developer present in the vicinity of the sensitizer.

Recently, methods have been employed to enhance the sensitivity of heat-sensitive recording materials by enhancing heat response of the sensitizer. As the sensitizers, there are proposed, for example, naphthol derivatives in Japanese Patent Kokai No. 58-87094, naphthoic acid derivatives in Japanese Patent Kokai No. 57-64592, benzoic acid ester derivatives in Japanese Patent Kokai No. 58-112788, p-benzylbiphenyl in Japanese Patent Kokai No. 60-122193, diphenoxyethanes in Japanese Patent Kokai No. 60-56588, and sulfides in Japanese Patent Kokai No. 61-242884.

As disclosed in the above references, improvement of sensitivity of heat-sensitive recording materials is directed to development of sensitizers excellent in heat response, but those which are satisfactory in characteristics such as color density and sensitivity have not yet been obtained.

Furthermore, heat-sensitive recording materials in which an electron-donating colorless dye precursor and an electron-accepting color developer are used have the defects in image stability. That is, if they are brought into contact with plastics such as polyvinyl chloride or with foods or cosmetics, the heat-sensitive color formed portion (recorded image portion) thereon readily disappears due to plasticizers or additives contained in the plastics or chemicals contained in the foods or cosmetics. Moreover, the color formed portion readily discolors when exposed to sunlight even for a short period of time. Owing to these defects, there is a limitation in use and application of the heat-sensitive recording materials and improvement thereof have been desired.

For the above-mentioned purpose, heat-sensitive recording materials utilizing microcapsules have been proposed, for example, in Japanese Patent Kokai No. 59-19193 (Japanese Patent Kokoku No. 2-2440) of the inventors. This patent publication discloses a heat-sensitive recording paper which comprises a support and microcapsules coated thereon which contain at least a color forming colorless dye, a color developer and a wax substance which is solid at room temperature but melts upon heating. This relates to a heat-sensitive recording paper prepared using microcapsules containing a color forming colorless dye, a color developer and a wax substance (a sensitizer), and color is formed inside the microcapsules without rupturing them.

In this patent publication, the following encapsulation methods are exemplified.

(1) A color forming colorless dye or a color developer is mixed and molten with a sensitizer. The respective mixtures are emulsified and the resulting emulsion of color forming colorless dye-sensitizer and emulsion of color developer-sensitizer are mixed and encapsulated.

This method (1) has a defects that concentration of the color forming colorless dye or the color developer in the sensitizer cannot be increased sufficiently because the dye and developer form deposition when their concentration is high. When an emulsion of each of said component is mixed and microencapsulated, capsules containing each alone are formed, so that mixture of them will make a heat-sensitive recording material of which colour development efficiency is poor.

(2) A color forming colorless dye or a color developer is mixed and molten with a sensitizer. The respective mixtures are emulsified and the resulting emulsion of color forming colorless dye-sensitizer and the emulsion of color developer-sensitizer are processed into quasi-capsules (very thinly walled capsules), respectively and these quasi-capsules are mixed and encapsuled.

(3) Finely dispersed color forming colorless dye and color developer are respectively encapsulated in the form of quasi-capsules and these quasi-capsules are mixed and dispersed in a molten sensitizer and then encapsulated.

The above methods (2) and (3) require the step of formation of quasi-capsules and hence are less efficient in productivity.

The object of the present invention is to provide a heat-sensitive recording composition high in sensitivity by use of heretofore widely used dye precursors, color developers, and sensitizers.

According to the present invention, there are provided a heat-sensitive recording composition comprising agglomerates which have an average diameter of 2–30 μm and comprise a colorless or light-colored dye precursor, a color developer which reacts with the dye precursor upon heating to form a color, and a sensitizer; and a process for producing the composition.

The present invention will be explained in detail.

The heat-sensitive recording composition of the present invention contains agglomerates as an essential component and optionally a binder, a pigment and other additives.

A heat-sensitive recording material can be obtained by providing a heat-sensitive recording layer by coating a heat-sensitive recording composition on a substrate.

The agglomerates comprise a dye precursor, a color developer and a sensitizer. The agglomerates contain each of the color developer and the sensitizer in an amount of 50–500, preferably 100–300 parts by weight based on 100 parts by weight of the dye precursor. When amount of each of the color developer and the sensitizer is less than 50 parts by weight, a large amount of unreacted dye precursor remains after use. When the amount is more than 500 parts by weight, a large amount of unreacted color developer remains after use. Both cases are not economical.

The agglomerates have an average diameter of 2–30 μm, preferably 3–20 μm, more preferably 5–10 μm.

Hitherto, each of the three components, the dye precursor, color developer and sensitizer, has been ground and dispersed respectively, or in combination of the two, i.e. the dye precursor and sensitizer, or the developer and sensitizer, so that each of them was ground down to an average diameter of about 0.5 μm and used as it was. It is considered that the smaller the diameter of the components the higher sensitivity would result. However, when paper is used for the substrate for a heat-sensitive recording material, its surface has irregularity portions due to pulp fibers, so that the thus finely ground particles of those components fill up recesses and the advantage of that fineness is not effectively utilized.

According to the present invention, the three components are agglomerated whereby the three components are prevented from filling up recesses of the substrate and are uniformly arranged on the surface of the substrate. Thus, high sensitivity can be attained. Moreover, since the finely dispersed three components are in the state of being close to one another in the agglomerates, color is very effectively formed upon transmission of heat of the thermal head to the agglomerates per se.

However, since thickness of the heat-sensitive recording layer of the heat-sensitive recording material is usually about 30 μm, if the agglomerates have a diameter of more than 30 μm, the agglomerates protrude beyond the heat-sensitive recording layer to result in deterioration of surface smoothness of the heat-sensitive material and to cause fogging with application of pressure. On the other hand, if average diameter is less than 2 μm, sensitivity is insufficient.

The heat-sensitive recording materials of the present invention comprising a support and the heat-sensitive recording composition coated thereon has another advantage in that the coated side has a low surface gloss (matte). This is because since the fine three components are agglomerated they easily scatter light, and agglomerates per se have a large particle diameter and are interspersed on the substrate. In general, heat-sensitive recording materials are high in gloss and have a defect that printed letters thereon are difficult to read. In order to inhibit glare of the coated surface, a method to impart lower gloss like a plain paper by applying a matte coating on a heat-sensitive recording layer is employed recently. In the present invention, such effect can be obtained only by coating the heat-sensitive recording composition on the substrate without applying such a matte coating.

Examples of the dye precursors used in the present invention are as follows.

(1) Triarylmethane compounds:

3,3-Bis(p-dimethylaminophenyl)-6-dimethylaminophthalide (crystal violet lactone), 3,3-bis(p-dimethylaminophenyl)phthalide, 3-(p-dimethylaminophenyl)-3-(1,2-dimethylindol-3-yl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis(1,2-dimethylindol-3-yl)-5-dimethylaminophthalide, 3,3-bis(1,2-dimethylindol-3-yl)-6-dimethylaminophthalide, 3,3-bis(9-ethylcarbazol-3-yl)-5-dimethylaminophthalide, 3,3-bis-(2-phenylindol-3-yl)-5-dimethylaminophthalide, and 3-p-dimethylaminophenyl-3-(1-methylpyrrol-2-yl)-6-dimethylaminophthalide.

(2) Diphenylmethane compounds:

4,4′-Bis-dimethylaminophenylbenzhydrylbenzyl ether, N-halophenylleucoauramine, and 2,4,5-trichlorophenylleucoauramine.

(3) Xanthene compounds:

Rhodamine B-anilinolactam, Rhodamine B-p-chloroanilinolactam, 3-diethylamino-7-dibenzylaminofluoran, 3-diethylamino-7-octylaminofluoran, 3-diethylamino-7-phenylfluoran, 3-diethylamino-7-chlorofluoran, 3-diethylamino-6-chloro-7-methylfluoran, 3-diethylamino-7-(3,4-dichloroanilino)fluoran, 3-diethylamino-7-2-chloroanilino)fluoran, 3-diethylamino-6-methyl-7-anilinofluoran, 3-(N-ethyl-N-tolyl)amino-6-methyl-7-anilinofluoran, 3-piperidino-6-methyl-7-anilinofluoran, 3-(N-ethyl-N-tolyl)amino-6-methyl-7-phenethylfluoran, 3-diethylamino-7-(4-nitroanilinofluoran, 3-dibutylamino-6-methyl-7-anilinofluoran, 3-(N-methyl-N-propyl)amino-6-methyl-7-anilinofluoran, 3-(N-ethyl-N-isoamyl)amino-6-methyl-7-anilinofluoran, 3-(N-methyl-N-cyclohexyl)amino-6-methyl-7-anilinofluoran, and 3-(N-ethyl-N-tetrahydrofuryl)amino-6-methyl-7-anilinofluoran.

(4) Thiazine compounds:

Benzoyl leuco methylene blue and p-nitrobenzoyl-leuco methylene blue.

(5) Spiro compounds:

3-Methylspirodinaphthopyran, 3-ethylspirodinaphthopyran, 3,3′-dichlorospirodinaphthopyran, 3-benzylspirodinaphthopyran, 3-methylnaphtho-(3-methoxybenzo)spiropyran, and 3-propylspirobenzopyran.

These may be used singly or in combination of two or more.

Examples of the color developers used in the present invention are phenol derivatives, aromatic carboxylic acid derivatives or metal compounds thereof, and N,N′-diarylthiourea derivatives. Among them, especially preferred are phenol derivatives and typical examples thereof are p-phenylphenol, p-hydroxyacetophenone, 4-hydroxy-4′-methyldiphenylsulfone, 4-hydroxy4′-isopropoxydiphenylsulfone, 4-hydroxy-4′-benzenesulfonyloxydiphenylsulfone, 1,1-bis-(p-hydroxyphenylpropane), 1,1-bis(p-hydroxyphenyl)pentane, 1,1-bis(p-hydroxyphenyl)hexane, 1,1-bis-(p-hydroxyphenyl)cyclohexane, 2,2-bis(p-hydroxyphenyl)propane, 2,2-bis(p-hydroxyphenyl)butane, 2,2-bis(p-hydroxyphenyl)hexane, 1,1-bis(p-hydroxyphenyl)2-ethylhexane, 2,2-bis(3-chloro-4-hydroxyphenyl)propane, 1,1-bis(p-hydroxyphenyl)-1-phenylethane, 1,3-bis[2-(p-hydroxyphenyl)-2-propyl]benzene, 1,3-bis[2-(3,4-dihydroxyphenyl)-2-propyl]benzene, 1,4-bis[2-(p-hydroxyphenyl)-2-propyl]-benzene, 4,4'-dihydroxydiphenyl ether, 4,4'-dihydroxydiphenylsulfone, 3,3'-dichloro-4,4'-dihydroxydiphenylsulfone, 3,3'-diallyl-4,4'-dihydroxydiphenylsulfone, 3,3'-dichloro-4,4'-dihydroxydiphenylsulfide, methyl 2,2-bis(4-hydroxyphenyl)acetate, butyl 2,2-bis(4-hydroxyphenyl)acetate, 4,4'-thiobis(2-t-butyl-5-methylphenol), bis(3-allyl-4-hydroxyphenyl)sulfone, 4-hydroxy-4'-isopropyloxydiphenylsulfone, 3,4-dihydroxy-4'-methyldiphenylsulfone, benzyl p-hydroxybenzoate, chlorobenzyl p-hydroxybenzoate, propyl p-hydroxybenzoate, butyl p-hydroxybenzoate, dimethyl 4-hydroxyphthalate, benzyl gallate, stearyl gallate, salicylanilide, and 5-chlorosalicylanilide.

Examples of the sensitizers used in the present invention are waxes such as N-hydroxymethylstearic acid amide, stearic acid amide,-palmitic acid amide, oleic acid amide, ethylene.bisstearic acid amide, ricinoleic acid amide, paraffin wax, microcrystalline wax, polyethylene wax, rice wax, and carnauba wax; naphthol derivatives such as 2-benzyloxynaphthalene; biphenyl derivatives such as p-benzylbiphenyl and 4-allyloxybiphenyl; polyether compounds such as 1,2-bis(3-methylphenoxy)ethane, 2,2'-bis(4-methoxyphenoxy)-diethyl ether, and bis(4-methoxyphenyl) ether; and carbonic acid or oxalic acid diester derivatives such as diphenyl carbonate, dibenzyl oxalate, and di(p-furolbenzyl) oxalate. These sensitizers may be used singly or in combination of two or more.

The heat-sensitive recording composition of the present invention usually contains binders.

As examples of the binders, mention may be made of water-soluble binders such as starches, hydroxyethyl cellulose, methyl cellulose, carboxymethyl cellulose, gelatin, casein, polyvinyl alcohol, modified polyvinyl alcohol, sodium polyacetate, acrylic acid amide/acrylic acid ester copolymer, acrylic acid amide/acrylic acid ester/methacrylic acid terpolymer, alkali salts of styrene/maleic anhydride copolymer, and alkali salts of ethylene/maleic anhydride copolymer; and latexes of polymers such as polyvinyl acetate, polyurethane, polyacrylic acid esters, styrene/butadiene copolymer, acrylonitrile/butadiene copolymer, methyl acrylate/-butadiene copolymer, and ethylene/vinyl acetate copolymer.

The heat-sensitive recording composition of the present invention may further contain pigments such as diatomaceous earth, talc, kaolin, calcined kaolin, calcium carbonate, magnesium carbonate, titanium oxide, zinc oxide, silicon oxide, aluminum hydroxide, and ureaformalin resin.

Moreover, for inhibition of wear of a thermal head and inhibition of sticking, if necessary, there may be added to the heat-sensitive recording composition metallic salts of higher fatty acids such as zinc stearate and calcium stearate, waxes such as paraffin, oxidized paraffin, polyethylene, polyethylene oxide, stearic acid amide, and castor wax; there may be further added a dispersing agent such as sodium dioctylsulfosuccinate, an ultraviolet absorber such as benzophenone type and benzotriazole type, a surfactant, and a fluorescent dye.

As the substrate on which the heat sensitive recording composition is to be coated, paper is maily used, but there may also be used nonwoven fabrics, plastic films synthetic papers, metallic foils and composite sheets comprising combination of them. Furthermore, there may also be used such substrate on which an undercoat layer containing inorganic pigments, organic pigments or the like has been coated.

The heat-sensitive recording composition of the present invention may be formulated into an ink comprising the agglomerates, a pigment, an organic solvent and a binder soluble in the organic solvent. Such an ink can be used for a spot printing by means of a printing machine such as flexographic press, rotogravure press or offset press.

In the first embodiment of the present invention, the heat-sensitive recording composition comprises agglomerates formed using a cationic dispersant.

In this case, the heat-sensitive recording composition is obtained by a process comprising the following steps.

(1) Each of the dye precursor, the color developer and the sensitizer is ground alone, or the dye precursor and mixture of the color developer and sensitizer, or the color developer and mixture of the sensitizer and dye precursor, are ground separately, until mean particles diameter comes down to 0.5–1.0 μm under presence of an anionic dispersing agent;

(2) The resulting dispersions are mixed; and (3) A cationic dispersing agent is added to the mixture, which is stirred to form agglomerates having a mean diameter of 2–30 μm and comprising the said three components.

The reason why the agglomerates are obtained by the above process is considered as follows. In the above step (1), the three components become negatively charged particles due to the presence of the anionic dispersant. In the above step (3), the negatively charged particles bond to the positively charged cationic dispersing agent to form an electrically neutral complex. As a result, the three components agglomerate one another, resulting in agglomerates comprising the three components.

The cationic dispersing agent includes cationic surface active agents, cationic polymers and the like.

Examples of the cationic surface active agents are amine salts, quaternary ammonium salts, phosphonium salts, sulfonium salts, and combinations thereof.

Examples of the cationic polymers are polyaminoalkyl methacrylate, aminoalkyl methacrylate-acrylamide copolymer, polyvinylpyridinium halides, polydiallylammonium halides, polyaminomethylacrylamide, polyvinylimidazoline, Mannich modified products of polyacrylamide, polyethyteneiminepolydiallylamine, polypyridinium halide chitosan, cationized starch, cationized cellulose, cationized polyvinyl alcohol, ionene condensates, epoxyamine condensates, cationized polymethacrylate resin, alkylenediamine-epichlorohydrin polycondensates, and combination thereof.

In view of stability of records (e.g., chemical resistance), the agglomerates are preferably microencapsulated. When the agglomerates are microencapsulated, discoloration of printed portion or color formation of unprinted portion hardly occurs even if the heat-sensitive recording material contacts with chemicals such as organic solvents.

Average diameter of the microcapsules is nearly the same as that of the agglomerates and hence is 2–30 μm, preferably 3–20 μm, more preferably 5–10 μm. When the average diameter exceeds 30 μm, there occur falling off of the microcapsules from the heat-sensitive recording material, roughening of the surface of the material and undesired color formation by scratching or frictional heat. The average diameter of less than 2 μm is impossible since size of the agglomerates to be microencapsulated is 2–30 μm as aforesaid.

The wall material of the microcapsules is preferably a thermocurable resin such as melamineformaldehyde resin or urea-formaldehyde resin. Use of a thermocurable resin prevents rupture of the microcapsules when the heat-sensitive recording material is imaged by heat, so that occurrence of sticking of the material to a thermal head or piling on a thermal head is inhibited.

In the second embodiment of the present invention, the agglomerates formed using a cationic dispersing agent are microencapsulated. In this case, the heat-sensitive recording composition is obtained by a process comprising the following steps.

(1) Each of the dye precursor, the color developer and the sensitizer is ground alone, or the dye precursor and mixture of the color developer and sensitizer, or the color developer and mixture of the sensitizer and dye precursor, are ground separately, until mean particles diameter comes down to 0.5–1.0 μm under presence of an anionic dispersing agent;

(2) The resulting dispersions are mixed; and (3) A cationic dispersing agent is added to the mixture, which is stirred to form agglomerates having a mean diameter of 2–30 μm and comprising the said three components.

(4) The thus prepared agglomerates are added to an anionic protective colloid solution and emulsified or dispersed; and (5) A wall forming material is added to the emulsion or dispersion to perform microencapsulation of the agglomerates.

According to the above process for production of the heat-sensitive recording composition, the three components can be microencapsulated more efficiently as compared to that attained according to conventional processed in terms of aspects explained in the following. After the three components are dispersed with the anionic dispersing agent in the step (1), the three components are agglomerated one another by adding the cationic dispersing agent in the step (3). In the thus formed agglomerates, the three components are gathered to a mass, which is stable with the lapse of time and can be handled in the same manner as for ordinary emulsified particles. In the step (4), the thus formed agglomerates are introduced into an anionic protective colloid solution for being dispersed or emulsified. It is considered that the surface of the agglomerates is converted from cationic state to anionic state or electrically neutral state by the protective colloid material. Thereafter, the microcapsule wall material is added thereto to carry out microencapsulation. The thus formed microcapsules apparently have a similar shape to that of the agglomerates since the wall is formed conforming to natural contour of the agglomerate. Since core material is the solid agglomerate, the microcapsules hardly rupture even when external pressure is applied, for example, by supercalender to the heat-sensitive recording material made by coating the microcapsules on a substrate. This is because the agglomerates are formed in the course of the production. Besides, in the thus formed microcapsules, the core material hardly develops color due to permeation of an organic solvent or the like through the wall.

As the cationic dispersing agents, those referred to in the first embodiment can be used.

The microencapsulation methods may be any known in the prior art, for example, complex coacervation method, in situ method, and interfacial polymerization method, of which preferred is the in situ method.

Use of a melamine-formaldehyde polymer or ureaformaldehyde polymer as the wall material is especially preferred for the in situ method, but there is no limitation about selection of the wall materials.

As the anionic protective colloid materials, mention may be made of, for example, carboxymethyl cellulose, sulfonated cellulose, sulfonated starch, carboxy-modified polyvinyl alcohol, polyacrylic acid, ethylene-maleic anhydride copolymer, methyl vinyl ether-maleic anhydride copolymer, vinyl acetate-maleic anhydride copolymer, and styrene-maleic anhydride copolymer.

As mentioned above, when the agglomerates are formed using a cationic dispersing agent, the step of emulsification or dispersion using anionic protective colloid is required.

In the third embodiment of the present invention, agglomerates formed using an alkali metal salts or ammonium salt of a copolymer of maleic anhydride and a monomer copolymerizable therewith are microencapsulated.

In this case, the heat-sensitive recording composition is obtained by a process comprising the following steps.

(1) Each of the dye precursor, the color developer and the sensitizer is ground alone, or the dye precursor and mixture of the color developer and sensitizer, or the color developer and mixture of the sensitizer and dye precursor, are ground separately, until means particles diameter comes down to 0.5–1.0 μm under presence of an anionic dispersing agent;

(2) The resulting dispersions are mixed;

(3) An alkali metal salt or an ammonium salt of a copolymer of maleic anhydride and a monomer copolymerizable therewith is added to the mixture, which is stirred to form agglomerates having a mean diameter of 2–30 μm and comprising the said three components; and (4) A wall forming material is added to the emulsion or dispersion to perform microencapsulation of the agglomerates.

The three components negatively charged in the above step (1) bond with the alkali metal salt or ammonium salt of copolymer of maleic anhydride and a monomer copolymerizable thereiwth to form a complex in the above step (3). As a result, the three components are combined into agglomerates. Since the alkali metal salt or ammonium salt of the copolymer exerts an emulsification or dispersing action, an emulsion or a dispersion of the agglomerates is obtained in the step (3). In the subsequent step (4), a wall material for microencapsulation is introduced and the agglomerates are enclosed in the microcapsules. Therefore, addition of anionic protective colloid required in the second embodiment is not required in this embodiment and thus, the production process is simplified as compared with that in the second embodiment.

Amount of the alkali metal salt or ammonium salt of the copolymer of maleic anhydride and a monomer copolymerizable therewith used above is 5–45 parts by weight, preferably 7.5–25 parts by weight based on 100 parts by weight of the three components (core materials) of the dye precursor, the color developer and the sensitizer. When the amount of the alkali metal salt or ammonium salt of the copolymer is less than 5 parts by weight, anionic portion in the core materials is somewhat excessive to cause incomplete formation of the agglomerates. Moreover, this amount is insufficient to perform emulsification and dispersion of the core material and hence, microencapsulation is also incomplete. When the amount is more than 45 parts by weight, the balance between the anionic portion in the core material and the cationic portion of the alkali metal salt or ammonium salt of the copolymer is lost and the cationic portion becomes excessive and as a result, agglomerates are hardly formed and particles composed of one of the above components alone are liable to be formed.

As the copolymers of maleic anhydride and a monomer copolymerizable therewith, there may be used, for example, ethylene-maleic anhydride copolymer, methyl vinyl ether-maleic anhydride copolymer, propylene-maleic anhydride copolymer, butadiene-maleic anhydride copolymer, isobutylene-maleic anhydride copolymer, isobutene-maleic anhydride copolymer, styrene-maleic anhydride copolymer, vinyl acetate-maleic anhydride copolymer, methacrylamidemaleic anhydride copolymer, and mixtures thereof.

Formation of the microcapsules is carried out in the same manner as in the second embodiment.

For further improvement of image stability, the microcapsules preferably enclose a polymer in addition to the agglomerates.

In general, agglomerates are amorphous and have voids therein and depressions on the surface. When such agglomerates are, as they are, enclosed in microcapsules, the microcapsules become amorphous and thickness of the wall is liable to become nonuniform. For this reason, microcapsules may be ruptured by application of pressure, and chemicals such as organic solvents may permeate into the microcapsules.

When the voids or depressions of the agglomerates are filled with a polymer and thereafter the agglomerates are microencapsulated, the microcapsules become nearly spherical or fusiform and thickness of the wall becomes more uniform. Accordingly, strength of the microcapsules increases and besides, permeation of organic solvents into microcapsules can be more effectively inhibited.

In the fourth embodiment of the present invention, the above polymer has a form of microemulsion having an average diameter of 0.2 μm or less.

In this case, the heat-sensitive recording composition is obtained by a process comprising the following steps.

(1) Each of the dye precursor, the color developer and the sensitizer is ground alone, or the dye precursor and mixture of the color developer and sensitizer, or the color developer and mixture of the sensitizer and dye precursor, are ground separately, until means particles diameter comes down to 0.5–1.0 μm under presence of an anionic dispersing agent;

(2) The resulting dispersions are mixed, then a microemulsion having an average emulsified particles diameter of 0.2 μm or less is added;

(3) An alkali metal salt or an ammonium salt of a copolymer of maleic anhydride and a monomer copolymerizable therewith is added to the mixture, which is stirred to form agglomerates having a mean diameter of 2–30 μm and comprising the said three components; and (4) A wall forming material is added to the emulsion or dispersion to perform microencapsulation of the agglomerates.

The microemulsion used here has an average diameter of 0.2 μm or less, preferably 0.1 μm or less, more preferably 0.05 μm or less. When the average diameter is more than 0.2 μm, the voids or depressions of the agglomerates are not sufficiently filled and image stability cannot be improved.

Addition amount of the microemulsion is 25–200 parts by weight, preferably 50–150 parts by weight, more preferably 75–125 parts by weight based on 100 parts by weight of total of the dye precursor, the color developer and the sensitizer. When the amount of the microemulsion is less than 25 parts by weight, voids in the agglomerates remain and this is not preferred. In other words, voids in the agglomerates are not sufficiently filled with the microemulsion and chemical resistance tends to be insufficient. On the other hand, when the amount is more than 250 parts by weight, proportions of the dye precursor and the color developer which take part in color formation reaction decrease, resulting in reduction of image density. Besides, coating amount must be increased and this is not economical.

The microemulsion includes a carboxylated emulsion, a solubilized emulsion and the like.

The carboxylated emulsion (this may be called "carboxylated latex", but is consistently referred to as "Carboxylated emulsion" in this specification) comprises a copolymer of a principal monomer and an unsaturated carboxylic acid. In general, it is difficult to reduce the average particle diameter of an emulsion (a latex) to less than 0.1 μm. However, the carboxylated emulsion is produced by adding an unsaturated carboxylic acid to a principal monomer to effect emulsion-polymerization, heating and dissolving the resulting emulsion in the presence of an alkali, and then cooling and neutralizing the emulsion and the thus produced carboxylated emulsion has an average particle diameter of 0.1 μm or less and is excellent in various properties such as mechanical stability, freeze stability, and adhesion.

Examples of the unsaturated carboxylic acid are acrylic acid, methacrylic acid, maleic acid, fumaric acid, crotonic acid, itaconic acid, maleic acid esters, fumaric acid esters, and itaconic acid esters. Examples of the principal monomer are, acrylonitrile, styrene, vinyl chloride, vinyl acetate, methyl acrylate, ethyl acrylate, butyl acrylate, 2-hexyl acrylate, butadiene, and ethylene.

As examples of the carboxylated emulsion, mention may be made of styrene-ethylhexyl acrylate copolymer, methyl methacrylate-ethylhexyl acrylate copolymer, methyl methacrylate-ethyl acrylate copolymer, methyl methacrylate-butadiene copolymer, styrene-ethyl acrylate compolymer, styrene-butyl acrylate copolymer, styrene-butadiene copolymer, styrene-butadiene-acrylic acid terpolymer, styrene-acrylic acid copolymer, vinyl acetate-ethylene copolymer, vinyl acetate-ethyl acrylate copolymer, vinyl acetate-butyl acrylate copolymer, vinyl acetate-butyl maleate copolymer, ethyl acryalte-acrylic acid copolymer, acrylonitrile-butadiene copolymer, ethylene-ethyl acrylate copolymer, and vinyl chlorideacrylic acid copolymer. These may be used singly or in combination of two or more.

The solubilized emulsion is obtained by emulsifying a heat meltable material with a solubilizing agent.

As examples of the solubilizing agents, mention may be made of surface active agents such as polyglycerine fatty acid esters, polyoxyethylene sorbitan fatty acid ester, polyoxyethylene castor oil, hardened castor oil, polyoxyethylene alkyl ether, polyoxyethylene phytosterol. phytostanol, polyoxyethylenepolyoxypropylenealkyl ether, polyoxyethylenealkylphenyl ether, polyoxyethylenelanolin.lanolin alcohol.bees wax derivatives, polyoxyalkylamine.fatty acid amide, and polyoxyalkyl ether phosphoric acid.phosphate.

As examples of the heat meltable materials, mention may be made of waxes such as bees wax, spermaceti, Chinese wax, wool wax, candelilla wax, carnauba wax, Japan wax, ouricury wax, sugar cane wax, montan wax, ozocerite, ceresine, lignite wax, paraffin wax, microcrystalline wax, petrolatum, low molecular weight polyethylene wax and derivatives thereof, castor wax, opal wax, oleic amide, lauric acid amide, erucic amide, behenic amide, palmitic amide, stearic amide, hydroxystearic amide, acrylamide, methylolstearic amide, methylolbehenic amide, ethylenebisstearic amide, ethylenebisoleic amide, and ethylenebislauric amide. These heat meltable materials may be used singly or in combination of two or more. The heat meltable materials include those which have an action as a sensitizer. However, the heat meltable materials are limited to those which can form microemulsion having an average diameter of 0.2 μm or less as mentioned above.

Dispersing of the three components and formation of microcapsules are carried out in the same manner as in the second embodiment.

In the fifth embodiment of the present invention, a water-soluble polymer is used in place of the microemulsion used in the fourth embodiment.

As examples of the water-soluble polymer, mention may be made of synthetic polymers such as polyvinyl alcohol, polyethylene glycol, polyacrylamide, polyacrylic acid esters, polymethacrylic acid esters, and polyesters; semisynthetic polymers such as methyl cellulose, ethyl cellulose, carboxyethyl cellulose, and hydroxyethyl cellulose; and natural polymers such as gelatin, gum arabic, and pullulan. These may be used singly or in combination of two or more.

When voids or depressions of the agglomerates are filled with the water-soluble polymer, the filling may often not proceed rapidly depending on conditions such as kind of the water-soluble polymer, temperature and stirring rate.

However, it has been found that the filling can be carried out rapidly by adding ammonia solution to at least one of the steps of production of the heat-sensitive recording composition.

That is, in the fifth embodiment of the present invention, the heat-sensitive recording composition is obtained by a process comprising the following steps.

(1) Each of the dye precursor, the color developer and the sensitizer is ground alone, or the dye precursor and mixture of the color developer and sensitizer, or the color developer and mixture of the sensitizer and dye precursor, are ground separately, until means particles diameter comes down to 0.5–1.0 μm under presence of an anionic dispersing agent;

(2) The resulting dispersions are mixed, then a water-soluble polymer is added;

(3) An alkali metal salt or an ammonium salt of a copolymer of maleic anhydride and a monomer copolymerizable therewith is added to the mixture, which is stirred to form agglomerates having a mean diameter of 2–30 μm and comprising the said three components; and (4) A wall forming material is added to the emulsion or dispersion to perform microencapsulation of the agglomerates.

wherein, ammonia solution is added in at least one of the above steps in an amount of 0.75–15.0 parts by weight (in terms of $NH_3$ content) based on 100 parts by weight of the components enclosed in the microcapsules.

The reason for the filling of voids or depressions of the agglomerates being rapidly attained by adding ammonia solution in at least one of the above steps has not yet been sufficiently elucidated, but can be presumed as follows. The water-solubilization phenomenon of the alkali metal salt or ammonium salt of the maleic anhydride copolymer which has the actions to form agglomerates and to perform emulsification and dispersion is further promoted by addition of ammonia solution. As a result, with progress of water-solubilization of the maleic anhydride copolymer, viscosity of the copolymer decreases. Therefore, this maleic anhydride copolymer having a reduced viscosity agglomerates the mixture of the above-mentioned three components and the water-soluble polymer to form agglomerates and in addition surrounds the agglomerates, resulting in gelling state to show a phase separation phenomenon in the aqueous medium. The respective agglomerates are surrounded with the maleic anhydride copolymer in the form of gel and are in stabilized state. Subsequently, with progress of microencapsulation, inside of the agglomerates is in the concentrated state and is completely filled with the water-soluble polymer. Furthermore, the excess water-soluble polymer fills the depressions on the surface of the agglomerates. Thus, the ammonia solution accelerates water-solubilization of the maleic anhydride copolymer and affects inside and outside of the formed agglomerates.

The ammonia solution may be added in any of the above four steps, but preferably is added in the step (2) or (3) because in these steps the effect of the ammonia solution on the maleic anhydride copolymer is more direct. Moreover, the ammonia solution may be added at one time or dividedly at several times without loss of the effect as far as the amount of the solution is within the range mentioned above.

The heat-sensitive recording composition is produced in the same manner as in the fourth embodiment, except that the water-soluble polymer and the ammonia solution are added.

The present invention is illustrated by the following examples, but they should not be construed as limiting the invention in any manner. In these examples, "part" and "%" represent "part by weight" and "% by weight", respectively unless otherwise notified.

Example 1

(1) Dispersing of the three compounds:

Each of the mixtures having the following compositions was ground and dispersed by a sand mill until average particle diameter reached about 0.5 μm.

| | |
|---|---|
| [Liquor A] Dispersion of dye precursor | |
| 3-Dibutylamino-6-methyl-7-anilinofluoran | 100 parts |
| 10% aqueous anionic polyvinyl alcohol solution | 50 parts |
| Water | 100 parts |
| [Liquor B] Co-dispersion of color developer-sensitizer | |
| Bisphenol A | 250 parts |
| Benzyloxynaphthalene | 250 parts |
| 10% aqueous anionic polyvinyl alcohol solution | 250 parts |
| Water | 500 parts |

(2) Preparation of agglomerates of the three components:

Liquor A and liquor B obtained in the above (1) were mixed with each other at the following ratio until the mixture became homogeneous and then, 300 parts of 10% aqueous cationized polyvinyl alcohol solution as a cationic dispersing agent was gently added to the resulting mixture with stirring. After stirring for 1 hour, the resulting dispersion was sampled and inspected under an optical microscope to monitor that agglomerates having an average particle diameter of 10 μm were formed.

| | |
|---|---|
| Liquor A (Solid content of dye precursor: 100 parts) | 250 parts |
| Liquor B (Solid contents of color developer and sensitizer: 250 parts, respectively) | 1250 parts |
| Cationic dispersing agent | 300 parts |

(3) Preparation of heat-sensitive coating composition:

A heat-sensitive coating composition of the following formulation was prepared using the agglomerates dispersion having an average particle diameter of 10 μm prepared in the above (2).

| | |
|---|---|
| Agglomerates dispersion (35%) | 360 parts |
| 40% Zinc stearate | 25 parts |
| 10% aqueous polyvinyl alcohol solution | 216 parts |
| Calcium carbonate | 50 parts |
| Water | 387 parts |

The thus obtained coating composition was coated on a base paper of 40 $g/m^2$ in basis weight at a coating amount (solid) of 6 $g/m^2$ using a Meyer bar, dried and then supercalendered to obtain a heat-sensitive recording material.

(4) Evaluation:

The resulting heat-sensitive recording material was evaluated for color density using GIII facsimile tester. The tester used was TH-PMD manufactured by Ohkura Denki K.K. and printing was carried out using a thermal head of 8 dots/mm in dot density, 1300Ω in head resistance at a head voltage of 22 V, and current duration of 1.0 ms. The color density of the printed image was measured by Macbeth RD-918 reflective densitometer.

Comparative Example 1

The liquor A and the liquor B prepared in Example 1 were used as they were (without forming agglomerates) to prepare a heat-sensitive coating composition at the following mixing ratio.

| | |
|---|---|
| Liquor A | 50 parts |
| Liquor B | 250 parts |
| 10% Aqueous polyvinyl alcohol solution | 216 parts |
| Calcium carbonate | 50 parts |
| Water | 417 parts |

The resulting coating composition was coated on a base paper of 40 $g/m^2$ in basis weight at a coating amount (solid) of 6 $g/m^2$ by a Meyer bar, dried and then supercalendered to obtain a heat-sensitive recording material.

This heat-sensitive recording material was subjected to printing and evaluated in the same manner as in Example 1.

| Results of evaluation: | Color density |
|---|---|
| Example 1 | 1.31 |
| Comparative Example 1 | 1.05 |

As can be seen from the above results, the heat-sensitive recording material prepared using the agglomerates in Example 1 show higher color density than the heat-sensitive recording material prepared without forming agglomerates in Comparative Example 1.

The color formed portion of the heat-sensitive recording materials was observed under an optical microscope. As a result, it was found that the color formed portion of the material of Example 1 retained the form of agglomerates while that of the material of Comparative Example 1 was in the state of fine dots as a whole.

Comparative Example 2

The same procedure as in Example 1 was repeated, except that anion modified polyvinyl alcohol was used in place of the cationized polyvinyl alcohol. As a result, formation of agglomerates was not recognized at all.

Comparative Example 3

In agglomeration of the three components in Example 1, amount of the 10% aqueous cationized polyvinyl alcohol solution was increased to 500 parts to prepare agglomerates having an average particle diameter of 35 μm. The resulting agglomerates were coated on a base paper of 40 $g/m^2$ in basis weight by a Meyer bar in the same manner as in Example 1. However, the surface of the coated side was observed to have roughness due to the agglomerates and this material was not preferred as a heat-sensitive recording material.

Examples 2–4 and Comparative Examples 4–6

Heat-sensitive recording materials were prepared in the same manner as in Example 1, except that a 15% aqueous polyaminomethylacrylamide solution was used in place of the cationic dispersing agent in Examples 2–4 while the cationic dispersing agent was eliminated in Comparative Examples 4–6. Moreover, ratio of the three components was varied as shown in Table 1. In Examples 2–4, diameter of the agglomerates was 3 μm, 6 μm, and 25 μm, respectively and in Comparative Examples 4–6, no agglomerates were formed. Color density was measured in the same manner as in Example 1 and the results are shown in Table 1.

TABLE 1

| | A | B | C | Color density |
|---|---|---|---|---|
| Example 2 | 100 | 300 | 500 | 1.28 |
| Example 3 | 100 | 200 | 300 | 1.33 |
| Example 4 | 100 | 50 | 100 | 1.20 |
| Comparative Example 4 | 100 | 300 | 500 | 1.03 |
| Comparative Example 5 | 100 | 200 | 300 | 1.05 |
| Comparative Example 6 | 100 | 50 | 100 | 0.86 |

In Table 1, A, B and C are as follows:
A: Dye precursor (part by weight)
B: Color developer (part by weight)
C: Sensitizer (part by weight)

As can be seen from Table 1, the recording materials of Examples 2–4 showed high color density and thus were high in sensitivity. On the other hand, amounts of the three components used in Comparative Examples 4–6 correspond to those of Examples 2–4, respectively, but the recording materials of comparative Examples 4–6 showed low color density and were low in sensitivity because the three components formed no agglomerates.

Example 5

(1) Dispersion of the three components:

Each of the mixtures having the following compositions was pulverized and dispersed by a sand mill until average particle diameter reached about 0.5 μm.

| | |
|---|---|
| [Liquor A] Dispersion of dye precursor | |
| 3-Dibutylamino-6-methyl-7-anilinofluoran | 100 parts |
| 10% aqueous anionic polyvinyl alcohol solution | 50 parts |
| Water | 100 parts |
| [Liquor B] Co-dispersion of color developer-sensitizer | |
| Bisphenol A | 250 parts |
| Benzyloxynaphthalene | 250 parts |
| 10% aqueous anionic polyvinyl alcohol solution | 250 parts |
| Water | 500 parts |

(2) Agglomeration of the three components:

Liquor A and liquor B obtained in the above (1) were mixed with each other at the following ratio using a 10% aqueous cationized polyvinyl alcohol solution as a cationic dispersing agent to prepare agglomerates which had an average particle diameter of 10 μm and comprised the three components.

| | |
|---|---|
| Liquor A (Solid content of dye precursor: 100 parts) | 250 parts |
| Liquor B (Solid contents of dye developer and sensitizer: 250 parts, respectively) | 1250 parts |
| Cationic dispersant | 300 parts |

(3) Preparation of microcapsules enclosing the agglomerates of the three components:

To 100 parts of a 5% aqueous solution having pH of 4.0 and containing styrene-maleic anhydride copolymer and a small amount of sodium hydroxide, was gradually added 100 parts of the 35% dispersion of the three components prepared in the above (2) and was dispersed and emulsified.

Separately, a mixture comprising 10 parts of melamine, 25 parts of 37% aqueous formaldehyde solution and 65 parts of water was adjusted to pH 9.0 with sodium hydroxide and was heated at 60° C. with stirring to perform dissolution to obtain a transparent melamine-formaldehyde precondensate.

To 200 parts of the emulsion of the three components was added 100 parts of the melamine-formaldehyde precondensate and reaction was allowed to proceed for 4 hours with stirring in a thermostat set at 60° C. Then, the product was cooled to room temperature to prepare microcapsules.

The resulting microcapsules had an average particle diameter of 10 μm and its shape was almost the same as that of the agglomerates. Solid content of the microcapsules containing liquor was 20%.

(4) Preparation of heat-sensitive coating composition:

A heat-sensitive coating composition was prepared with the following formulation using the aqueous dispersion of the microcapsules having an average particle diameter of 10 μm prepared in the above (3).

| | |
|---|---|
| Microcapsules (20%) | 200 parts |
| 10% Aqueous polyvinyl alcohol solution | 90 parts |
| Calcium carbonate | 20 parts |
| Water | 35 parts |

The thus obtained 20% coating composition was coated on a base paper of 40 $g/m^2$ in basis weight at a coating amount (solid) of 8.5 $g/m^2$ using a Meyer bar, dried and then supercalendered to obtain a heat-sensitive recording material. The surface of the coated side was observed under an optical microscope to find that the microcapsules were damaged quite a little by the pressing treatment by the supercalender.

(5) Evaluation:

The resulting heat-sensitive recording material was measured for color density using G III facsimile tester. The tester used was TH-PMD manufactured by Ohkura Denki Co. and printing was carried out using a thermal head of 8 dots/mm in dot density and 1300Ω in head resistance at a head voltage of 22 V and current flowing time of 1.0 ms. The color density of the printed image was measured by Macbeth RD-918 reflective densitometer.

Comparative Example 7

The liquid A and the liquid B prepared in Example 5 were used as they were (without forming agglomerates) to prepare a heat-sensitive coating composition in the following mixing ratio.

| | |
|---|---|
| Liquor A | 10 parts |
| Liquor B | 50 parts |
| 10% Aqueous polyvinyl alcohol solution | 66 parts |
| Calcium carbonate | 20 parts |
| Water | 107 parts |

The resulting 20% coating composition was coated on a base paper of 40 $g/m^2$ in basis weight at a coating amount (solid content) of 6 $g/m^2$ by a Meyer bar, dried and then treated by a supercalender to obtain a heat-sensitive recording material.

This heat-sensitive recording material was subjected to printing and evaluated in the same manner as in Example 5. Moreover, 75° gloss of the coated surface of the heat-sensitive recording material was measured.

| Results of evaluation: | Color density | 75° gloss |
|---|---|---|
| Example 5 | 1.26 | 12 |
| Comparative Example 7 | 1.01 | 38 |

As can be seen from the above results, the heat-sensitive recording material prepared using the microcapsules in Example 5 showed higher color density than the heat-sensitive recording material prepared without forming agglomerates in Comparative Example 7. Furthermore, the recording material obtained in Example 5 had a low 75° gloss of 12, which is the same as that of plain papers while the recording material of Comparative Example 7 had a high gloss of 38.

Observation of the color formed portion of the heat-sensitive recording materials under an optical microscope showed that color was formed inside the microcapsules in the color formed portion of the material of Example 5. On the other hand, in the color formed portion of the material of Comparative Example 7, the coating composition penetrated into the substrate to show no shade in color.

As another evaluation, chemical resistance was evaluated by putting droplets of acetone on the coated surface (unprinted portion) of the heat-sensitive recording material obtained in Example 5 and Comparative Example 7, and observing that portion.

As a result, no change was seen on the surface of the material of Example 5, i.e. the surface remained white, while in the material of Comparative Example 7, the color forming component was dissolved with acetone to result in a black spot. Thus, it was confirmed that in the material of Example 5, the color forming components were covered with the microcapsule wall.

Comparative Example 8

In agglomeration of the three components in Example 5, amount of the 10% aqueous cationized polyvinyl alcohol solution was increased to 500 parts and agglomerates having an average particle diameter of 35 μm were prepared. And then microcapsules were prepared in the same manner as in Example 5. The resulting microcapsules were coated on a base paper of 40 g/m$^2$ in basis weight by a Meyer bar in the same manner as in Example 5. However, the surface of the coated side was observed to have roughness due to the microcapsules and this material was not preferred as a heat-sensitive recording material.

Example 6

(1) Dispersion of the three components:

Each of the mixtures having the following compositions was ground and dispersed by a sand mill until average particle diameter reached about 0.5 μm.

| | |
|---|---|
| [Liquor A] Dispersion of dye precursor | |
| 3-Dibutylamino-6-methyl-7-anilinofluoran | 150 parts |
| 10% aqueous anionic polyvinyl alcohol solution | 75 parts |
| Water | 150 parts |
| [Liquor B] Co-dispersion of color developer-sensitizer | |
| Bisphenol A | 200 parts |
| Benzyloxynaphthalene | 200 parts |
| 10% aqueous anionic polyvinyl alcohol solution | 200 parts |
| Water | 400 parts |

(2) Preparation of microcapsules enclosing the three components:

37.5 parts of 40% liquid A (dispersion of dye precursor) and 100 parts of 40% liquid B (co-dispersion of color developer-sensitizer) obtained in the above (1) were mixed with each other until a homogeneous mixture was obtained. 137.5 parts of the mixture of liquor A and liquor B was gradually added with 110 parts of an 5% aqueous solution of sodium salt of styrene-maleic anhydride copolymer adjusted to pH 4.0 with stirring. Stirring was carried out for about 30 minutes to obtain agglomerates having an average particle diameter of 10 μm and it was simultaneously confirmed that the agglomerates were emulsified and dispersed. Separately, a mixture comprising 15 parts of melamine, 37.5 parts of a 37% aqueous formaldehyde solution and 97.5 parts of water was adjusted to pH 9.0 with sodium hydroxide and then was heated at 60° C. with stirring to perform dissolution to obtain 150 parts of a transparent melamine-formaldehyde precondensate.

150 parts of this melamine-formaldehyde precondensate was added gently to 247.5 parts of the above emulsified and dispersed liquor and reaction was allowed to proceed for 4 hours with stirring in a thermostat set at 60° C. Then, the product was cooled to room temperature to prepare microcapsules. The resulting microcapsules had an average particle diameter of 10 μm which was almost the same as that of the agglomerates and solid content in the aqueous dispersion of the microcapsules was 22.5%.

(3) Preparation of heat-sensitive coating composition:

A heat-sensitive coating composition was prepared with the following formulation using the aqueous dispersion of the microcapsules having an average particle diameter of 10 μm prepared in the above (2).

| | |
|---|---|
| Microcapsule aqueous dispersion (20%) | 200 parts |
| 10% Aqueous polyvinyl alcohol solution | 90 parts |
| Calcium carbonate | 20 parts |
| Water | 35 parts |

The thus obtained 20% coating composition was coated on a base paper of 40 g/m$^2$ in basis weight at a coating amount (solid) of 6 g/m$^2$ by a Meyer bar, dried and then treated by a supercalender to obtain a heat-sensitive recording material. The surface of the coat was observed under an optical microscope to find that the microcapsules were damaged quite a little by the pressing treatment by the supercalender.

(4) Evaluation:

The resulting heat-sensitive recording material was measured for of color density using G III facsimile tester. The tester used was TH-PMD manufactured by Ohkura Denki K.K. and printing was carried out using a thermal head of 8 dots/mm in dot density, 1300Ω in head resistance at a head voltage of 22 V and current duration of 1.0 ms. The color density of the printed image was measured by Macbeth RD-918 reflective densitometer.

Comparative Example 9

The liquor A and the liquor B prepared in Example 6 were used as they were (without forming agglomerates)

to prepare a heat-sensitive coating composition in the following mixing ratio.

| | |
|---|---|
| Liquid A (dispersion of dye precursor) | 15 parts |
| Liquid B (co-dispersion of color developer-sensitizer) | 40 parts |
| 10% Aqueous polyvinyl alcohol solution | 57 parts |
| Calcium carbonate | 16 parts |
| Water | 90.5 parts |

The resulting 20% coating composition was coated on a base paper of 40 g/m$^2$ in basis weight at a coating amount (solid content) of 3.6 g/m$^2$ by a Meyer bar, dried and then treated by supercalender to obtain a heat-sensitive recording material.

This heat-sensitive recording material was subjected to printing and evaluation in the same manner as in Example 6. Moreover, 75° gloss of the coated surface of the heat-sensitive recording material was measured.

The results are shown in Table 2.

TABLE 2

| | Color density | 75° gloss |
|---|---|---|
| Example 6 | 1.21 | 13 |
| Comparative Example 9 | 1.03 | 35 |

As can be seen from the above Table 2, the heat-sensitive recording material prepared using the microcapsules in Example 6 showed higher color density than the heat-sensitive recording material prepared without forming agglomerates in Comparative Example 9. Furthermore, the recording material obtained in Example 6 had a low 75° gloss of 13, which is the same as that of plain papers while the recording material of Comparative Example 9 had a high gloss of 35. Observation of the color formed portion of the heat-sensitive recording materials under an optical microscope showed that color was formed inside the microcapsules and this portion of the substrate was interspersed with these microcapsules in the material of Example 6. On the other hand, in the color formed portion of the material of Comparative Example 9 the coating composition penetrated into the substrate to show less tinctorial power.

As another evaluation, chemical resistance was evaluated by putting a droplet of acetone on the coated surface (unprinted portion) of the heat sensitive recording materials obtained in Example 6 and Comparative Example 9, and observing that portion. As a result, no change was seen on the surface of the material of Example 6, i.e. color remained white, while in the material of Comparative Example 9, the color forming component was dissolved with acetone to result in a black spot. Thus, it was confirmed that in the material of Example 6, the color forming components were covered with the microcapsule wall.

Comparative Example 10

Microcapsules enclosing therein the three components were prepared in the same manner as in Example 6, except that amount of the 5% aqueous solution of sodium salt of styrene-maleic anhydride copolymer used was 44 parts in place of 100 parts in preparation of microcapsules enclosing therein the three components. This amount of sodium salt of 5% styrene-maleic anhydride copolymer corresponds to 4 parts based on 100 parts of the three components. As a result, agglomeration of the three components was insufficient since the amount of the sodium salt of styrene-maleic anhydride copolymer was too small. Moreover, microencapsulation was not sufficiently attained because formation of the microcapsule wall was incomplete.

Comparative Example 11

Microcapsules enclosing therein the three components were prepared in the same manner as in Example 6, except that amount of the 5% aqueous solution of sodium salt of styrene-maleic anhydride copolymer used was 550 parts in place of 100 parts in preparation of microcapsules enclosing therein the three components. This amount of sodium salt of 5% styrene-maleic anhydride copolymer corresponds to 50 parts based on 100 parts of the three components. As a result, since the amount of the sodium salt of styrene-maleic anhydride copolymer was too large and cationic property imparted with the sodium salt was excessive, agglomerates were collapsed in the course of addition of the three components and returned to the particles of each component. Therefore, though microencapsulation was attained, most of the microcapsules enclosed the particles of each component.

Example 7

(1) Dispersion of the three components:

Each of the mixtures having the following compositions was pulverized and dispersed by a sand mill until average particle diameter reached about 0.5 μm.

| | |
|---|---|
| [Liquor A] Dispersion of dye precursor | |
| 3-Dibutylamino-6-methyl-7-anilinofluoran | 150 parts |
| 10% aqueous anionic polyvinyl alcohol solution | 75 parts |
| Water | 150 parts |
| [Liquor B] Co-dispersion of color developer-sensitizer | |
| Bisphenol A | 200 parts |
| Benzyloxynaphthalene | 200 parts |
| 10% aqueous anionic polyvinyl alcohol solution | 200 parts |
| Water | 400 parts |

(2) Preparation of microcapsules:

Previously, 37.5 parts of 40% liquor A (dispersion of dye precursor) and 150 parts of 40% liquor B (co-dispersion of color developer-sensitizer) obtained by grinding and dispersing in the above (1) were mixed with each other until a homogeneous mixture was obtained. The resulting homogeneous mixture of liquor A and liquor B was mixed with 160 parts of a 47% carboxylated styrene-butadiene rubber latex (average emulsified particle diameter: 0.016 μm) as a microemulsion and the mixture was homogenized to prepare a core material. Then, 347.5 parts of the mixture of the liquor A, liquor B and microemulsion was gradually added to 300 parts of a 5% aqueous solution of sodium salt of styrene-maleic anhydride copolymer adjusted to pH 4.0. Stirring was effected for about 30 min to obtain roundish agglomerates having an average particle diameter of 10 μm and it was simultaneously confirmed that the agglomerates were able to be emulsified and dispersed.

Separately, a mixture of 40 parts of melamine, 100 parts of a 37% aqueous formaldehyde solution and 260 parts of water was adjusted to pH 9.0 with sodium hydroxide and then was heated at 60° C. with stirring to perform dissolution to obtain 400 parts of a transparent melamine-formaldehyde precondensate. 400 parts of this melamine-formaldehyde precondensate was added gently to 647.5 parts of the above emulsified and dispersed liquid and reaction was allowed to proceed for 4 hours with stirring in a thermostat set at 60° C. Then, the product was cooled to room temperature to prepare microcapsules. It was confirmed that the resulting microcapsules had an average particle diameter of 10 μm which was almost the same as that of the agglomerates and had a roundish fusiform shape. Solid concentration of the aqueous dispersion of the microcapsules was 23%.

(3) Preparation of heat-sensitive coating composition:

A heat-sensitive coating composition was prepared with the following formulation using the aqueous dispersion of the microcapsules having an average particle diameter of 10 μm prepared in the above (2).

| | |
|---|---|
| Microcapsule aqueous dispersion (20%) | 200 parts |
| 10% Aqueous polyvinyl alcohol solution | 50 parts |
| Calcium carbonate | 10 parts |
| Water | 15 parts |

The thus obtained 20% coating composition was coated on a base paper of 40 g/$m^2$ in basis weight at a coating amount (solid) of 12 g/$m^2$ by a Meyer bar, dried and then treated by a supercalender to obtain a heat-sensitive recording material. The surface of the coated side was observed under an optical microscope to find that the microcapsules were not damaged by the pressing treatment by the supercalender.

(4) Evaluation:

The resulting heat-sensitive recording material was measured for color density using G III facsimile tester. The tester used was TH-PMD manufactured by Ohkura Denki K.K. and printing was carried out using a thermal head of 8 dots/mm in dot density, 1300Ω in head resistance at a heat voltage of 22 V and current duration of 10 ms. The color density of the printed image was 1.23 measured by Macbeth RD-918 reflective densitometer. Moreover, according to observation under an optical microscope, in the color formed portion the microcapsules were not ruptured and color was formed inside the microcapsules.

As another evaluation, chemical resistance was evaluated by putting a droplet of acetone on the coated surface (unprinted portion) of the heat-sensitive recording material and observing the portion. As a result, no change was seen on the surface, i.e. color remained white. In addition, acetone was put in the same manner on the color formed portion to find no decrease in color density. Therefrom, the effect was recognized that the color forming components were completely covered with the microcapsule wall.

Comparative Example 12

The liquor A and the liquor B prepared in Example 7 were used as they were (without forming agglomerates) to prepare a heat-sensitive coating composition at the following mixing ratio.

| | |
|---|---|
| 40% Liquid A (dispersion of dye precursor) | 15 parts |
| 40% Liquid B (co-dispersion of color developer-sensitizer) | 60 parts |
| 10% Aqueous polyvinyl alcohol solution | 50 parts |
| Calcium carbonate | 20 parts |
| Water | 130 parts |

The resulting 20% coating composition was coated on a base paper of 40 g/$m^2$ in basis weight at a coating amount (dry solid content) of 5.0 g/$m^2$ by a Meyer bar, dried and then treated by a supercalender to obtain a heat-sensitive recording material.

This heat-sensitive recording material was subjected to printing and evaluation in the same manner as in Example 7 to obtain a color density of 1.05 which was lower than the value obtained in Example 7. Observation of the color formed portion under an optical microscope showed that the reaction product penetrated into the substrate, resulting in a color of less tinctorial power.

As another evaluation, chemical resistance was evaluated by putting a droplet of acetone on the coated surface (unprinted portion) of the heat-sensitive recording material obtained above and observing that portion. As a result, the color forming components were dissolved in acetone and reacted with each other to result in a black spot. Similarly, acetone was put on the color formed portion to find that the density decreased and chemical resistance was insufficient.

Example 8

(1) Dispersion of the three components:

Each of the mixtures having the following compositions was ground and dispersed by a sand mill until average particle diameter reached about 0.5 μm.

| | |
|---|---|
| [Liquor A] Dispersion of dye precursor | |
| 3-Dibutylamino-6-methyl-7-anilinofluoran | 100 parts |
| 10% aqueous anionic polyvinyl alcohol solution | 50 parts |
| Water | 100 parts |
| [Liquor B] Co-dispersion of color developer sensitizer | |
| Bisphenol A | 100 parts |
| Benzyloxynaphthalene | 100 parts |
| 10% aqueous anionic polyvinyl alcohol solution | 100 parts |
| Water | 200 parts |

(2) Preparation of microcapsules:

Previously, 50 parts of 40% liquid A (dispersion of dye precursor) and 100 parts of 40% liquid B (codispersion of color developer-sensitizer) obtained by grinding and dispersing in the above (1) were mixed with each other until a homogeneous mixture was obtained. The resulting homogeneous mixture of liquid A and liquid B was mixed with 75 parts of a 40% solubilized emulsion (average particle diameter 0.05 μm) comprising microcrystalline wax having a melting point of 75° C. as a microemulsion and the mixture was homogenized to obtain a core material. Then, 225 parts of the liquor A-liquor B-microemulsion mixture was gradually added to 180 parts of a 5% aqueous solution of sodium salt of styrene-maleic anhydride copolymer adjusted to pH 4.0 with stirring. Stirring was continued for about 30 minutes to obtain roundish agglomerates having an average particle diameter of 10 μm and it was also found that the agglomerates were emulsified and dispersed. Separately, a mixture of 24 parts of melamine, 60 parts of a 37% aqueous formaldehyde solution and 156 parts of water was adjusted to pH 9.0 with sodium hydroxide and was heated at 60° C. with stirring to perform dissolution to obtain 240 parts of a transparent melamine-formaldehyde precondensate. Then, 240 parts of this melamine-formaldehyde precondensate was added gently to 405 parts of the above emulsified and dispersed liquid and reaction was allowed to proceed for 4 hours with stirring in a thermostat set at 60° C. Then, the product was cooled to room temperature to prepare microcapsules. It was confirmed that the resulting microcapsules had an average particle diameter of 10 μm which was almost the same as that of the agglomerates and had a roundish fusiform shape. Solid concentration of the aqueous dispersion of the microcapsules was 22.5%. Amount of the solubilized emulsion used here corresponds to 50 parts by weight based on 100 parts by weight of the three components (dye precursor, color developer and sensitizer) in total.

(3) Preparation of heat-sensitive coating composition and evaluation thereof:

A heat-sensitive coating composition was prepared with the following formulation using the aqueous dispersion of the microcapsules having an average particle diameter of 10 μm prepared in the above (2).

| | |
|---|---|
| Microcapsule aqueous dispersion (20%) | 200 parts |
| 10% Aqueous polyvinyl alcohol solution | 50 parts |
| Calcium carbonate | 10 parts |
| Water | 15 parts |

The thus obtained 20% coating composition was coated on a based paper of 40 $g/m^2$ in basis weight at a coating amount (dry solid content) of 6 $g/m^2$ by a Meyer bar, dried and then treated by a supercalender to obtain a heat-sensitive recording material. The surface of the coated side was observed under an optical microscope to find that the microcapsules were not damaged by the pressing treatment by the supercalender. Results of evaluation are shown in Table 3.

Examples 9–12 and Comparative Example 13

Microcapsules were prepared in the same manner as in Example 8, except that amount of the 40% solubilized emulsion (average particle diameter: 0.05 μm) used was varied. Using the resulting microcapsules, heat-sensitive coating compositions were produced and then heat-sensitive recording materials were prepared in the same manner as in Example 8. Amounts of the microemulsion based on 100 parts by weight of the three components in total and the coating amount (dry solid content) of the coating composition are shown in Table 3. Moreover, evaluation of the heat-sensitive recording materials was conducted in the same manner as in Example 7. Evaluation of chemical resistance was carried out by putting a droplet of acetone on the colored and unprinted portions, and density of the color formed spot after volatilization of the solvent was measured by Macbeth RD-918 reflective densitometer.

TABLE 3

| | Amount of solubilized emulsion (Part by weight | Coating amount of coating composition (dry solid) ($g/m^2$) | Color density | Chemical resistance Colored portion | Chemical resistance Un-printed portion |
|---|---|---|---|---|---|
| Example 8 | 50 | 6.0 | 1.31 | 1.30 | 0.07 |
| Example 9 | 25 | 5.0 | 1.36 | 1.33 | 0.09 |
| Example 10 | 150 | 10.0 | 1.21 | 1.21 | 0.07 |
| Example 11 | 200 | 12.0 | 1.18 | 1.18 | 0.07 |
| Example 12 | 20 | 4.8 | 1.33 | 1.05 | 0.16 |
| Comparative Example 13 | 225 | 13.0 | 1.11 | 1.11 | 0.07 |

As can be seen from the results shown in Table 3, high color density was obtained in Examples 8–12. With reference to the chemical resistance, color density of the color formed portion showed no or little change as compared with the initial density in Examples 8–11. However, in Example 12, color density decreased in the color formed portion and chemical resistance was somewhat inferior because amount of the solubilized emulsion used was small. Furthermore, it is recognized that in Comparative Example 13, color density was low and sensitivity was inferior because amount of the solubilized emulsion was large.

Example 13

(1) Dispersion of the three components:

Each of the mixtures having the following compositions was pulverized and dispersed by a sand mill until average particle diameter reached about 0.5 μm.

| | |
|---|---|
| [Liquor A] Dispersion of dye precursor | |
| 3-Dibutylamino-6-methyl-7-anilinofluoran | 150 parts |
| 10% aqueous anionic polyvinyl alcohol solution | 75 parts |
| Water | 150 parts |
| [Liquor B] Co-dispersion of color developer-sensitizer | |
| Bisphenol A | 200 parts |
| Benzyloxynaphthalene | 200 parts |
| 10% aqueous anionic polyvinyl alcohol solution | 200 parts |
| Water | 400 parts |

(2) Preparation of microcapsules:

Previously, 75 parts of 40% liquid A (dispersion of dye precursor) and 150 parts of 40% liquid B (codispersion of color developer-sensitizer) obtained by grinding and dispersing in the above (1) were mixed with each other until a homogeneous mixture was obtained. The resulting homogeneous mixture of liquor A and liquor B was mixed with 225 parts of a 40% aqueous solution of a polyacrylate ester copolymer as a water-soluble polymer and the mixture was homogenized to obtain a core material. To the core material was added 32 parts of a 28% aqueous ammonia solution (corresponding to 5 parts by weight based on 100 parts by weight of the components enclosed in the microcapsules) to obtain a homogeneous mixture. Then, 482 parts of the mixture of the liquor A-liquor B-water-soluble polymer modulated with ammonia was gradually added to 360 parts of a 5% aqueous solution of sodium salt of styrene-maleic anhydride copolymer adjusted to pH 4.0 with stirring. Stirring was continued for about 30 minutes to obtain roundish agglomerates having an average particle diameter of 10 μm and it was also found that the agglomerates were emulsified and dispersed. Separately, a mixture of 48 parts of melamine, 120 parts of a 37% aqueous formaldehyde solution and 312 parts of water was adjusted to pH 9.0 with sodium hydroxide and was heated at 60° C. with stirring to perform dissolution to obtain 480 parts of a transparent melamineformaldehyde precondensate. Then, 480 parts of this melamine-formaldehyde precondensate was gently added to 842 parts of the above emulsified and dispersed liquid and reaction was allowed to proceed for 4 hours with stirring in a thermostat set at 60° C. Then, the product was cooled to room temperature to prepare microcapsules. It was confirmed that the resulting microcapsules had an average particle diameter of 10 μm which was almost the same as that of the agglomerates and had a roundish fusiform shape. Solid concentration of the aqueous dispersion of the microcapsules was 23%.

(3) Preparation of heat-sensitive recording composition:

A heat-sensitive coating composition was prepared with the following formulation using the aqueous dispersion of the microcapsules having an average particle diameter of 10 μm prepared in the above (2).

| | |
|---|---|
| Microcapsule aqueous dispersion (20%) | 200 parts |
| 10% Aqueous polyvinyl alcohol solution | 50 parts |
| Calcium carbonate | 10 parts |
| Water | 15 parts |

The thus obtained 20% coating composition was coted on a base paper of 40 g/m$^2$ in basis weight at a coating amount (dry solid) of 8.5 g/m$^2$ by a Meyer bar, dried and then treated by a supercalender to obtain a heat-sensitive recording material. The surface of the coated side was observed under an optical microscope to find that the microcapsules were not damaged by the pressing treatment by the supercalender.

(4) Evaluation:

The resulting heat-sensitive recording material was measured for color density using G III facsimile tester. The tester used was TH-PMD manufactured by Ohkura Denki K.K. and printing was carried out using a thermal head of 8 dots/mm in dot density, 1300Ω in head resistance at a head voltage of 22 V and current duration of 10 ms. The color density of the printed image was 1.25 measured by Macbeth RD-918 reflective densitometer. Moreover, according to observation under an optical microscope, in the color formed portion the microcapsules were not ruptured and color was formed inside the microcapsules.

As another evaluation, chemical resistance was evaluated by putting a droplet of acetone on the coated surface (unprinted portion) of the heat-sensitive recording material and observing that portion. As a result of measurement of whiteness of the coated surface (background) and the portion on which acetone was put by Macbeth RD-918 reflective densitometer, both of the portions had a whiteness of 0.06. Moreover, acetone was also put on the color formed portion and as a result, color density of the color formed portion was 1.25 and that of the acetone-treated portion was 1.25. This shows the effect that the color forming components were completely covered with microcapsule wall.

Examples 14–17

In Examples 14–16, microcapsules were prepared in the same manner as in Example 13, except that the 28% aqueous ammonia solution was respectively used in the amounts of 0.75 parts by weight, 10 parts by weight and 15 parts by weight based on 100 parts by weight of the components enclosed in the microcapsules in place of the amount thereof in (2) of Example 13 (corresponding to 5 parts by weight based on 100 parts by weight of the components enclosed in the microcapsules). In the same manner as in Example 13, heat-sensitive recording compositions were produced and then heat-sensitive recording materials were prepared using the resulting microcapsules. In Example 17, microcapsules were prepared without adding the aqueous ammonia solution and a heat-sensitive recording composition and then a heat-sensitive recording material were prepared in the same manner as in Example 13. Amount of the aqueous ammonia solution based on 100 parts by weight of the components enclosed in the microcapsules and coating amount (dry solid content) of the heat-sensitive coating composition are shown in Table 4. Evaluation of the thus obtained heat-sensitive recording materials was conducted in the same manner as in Example 13, namely, by subjecting them to color formation using G III facsimile tester and putting acetone on the color formed portion and the unprinted portion, volatilizing acetone, and thereafter, measuring density by Macbeth RD-918 reflective densitometer.

TABLE 4

| | Amount of aqueous ammonia solution (part by weight) | Coating amount of coating composition g/m$^2$ | Color formed portion | | Unprinted portion (background) | |
|---|---|---|---|---|---|---|
| | | | Untreated | Treated | Untreated | Treated |
| Example 14 | 0.75 | 8.3 | 1.26 | 1.23 | 0.06 | 0.08 |
| Example 15 | 10 | 8.8 | 1.26 | 1.26 | 0.06 | 0.06 |
| Example 16 | 15 | 9.0 | 1.25 | 1.25 | 0.06 | 0.06 |
| Example 17 | 0 | 8.2 | 1.24 | 1.03 | 0.06 | 0.15 |
| Comparative Example 14 | 16 | 9.0 | 1.13 | 0.96 | 0.06 | 0.22 |

A can be seen from the above Table 4, when the water-soluble polymer was used for internal filling of the agglomerates, both the color formed portion and the unprinted portion (background portion) retained the initial density and showed substantially no decrease in Examples 14–16 in which aqueous ammonia solution was added.

On the other hand, in Example 17 in which aqueous ammonia solution was not added, density of the color formed portion decreased from 1.24 to 1.03 (desensitized) and density of the unprinted portion (background) increased from 0.06 to 0.15 which showed occurrence of fogging in the background. Since aqueous ammonia solution was not used in microencapsulation, wall of the microcapsules was not uniform and somewhat inferior in chemical resistance.

In Comparative Example 14, aqueous ammonia solution was added in excess, namely, in an amount of 16 parts by weight based on 100 parts by weight of the components enclosed in the microcapsules. Owing to the influence of the excessive aqueous ammonia solution, the agglomerates once formed were separated in microencapsulation and microencapsulation was incomplete. Moreover, emulsified particles of melamine which was a wall material were singly formed and were in the state of admixture with microcapsules. Therefore, color density was low although the coating composition was coated in the proper amount. It was found that the color formed portion and the unprited portion on which acetone was put showed decrease in color density (desensitization) and fogging occurred in the background.

What is claimed is:

1. A process for producing a heat-sensitive recording composition comprising agglomerates formed using a cationic dispensing agent which comprise a colorless or light-colored dye precursor, a color developer which reacts with the dye precursor upon heating to form a color, and a sensitizer and have an average diameter of 2–30 $\mu$m, said process comprising the following steps:

(1) grinding each of the dye precursor, the color developer and the sensitizer alone; or grinding separately the dye precursor and a mixture of the sensitizer and the color developer, or the color developer and a mixture of the sensitizer and the dye precursor, in the presence of an anionic dispersing agent until average particle diameter comes down to 0.5–1.0 $\mu$m, (2) mixing the resulting dispersions, and (3) adding a cationic dispersing agent to the resulting mixture with stirring to form agglomerates having an average diameter of 2–30 $\mu$m and comprising the above three components.

2. A process for producing a heat-sensitive recording composition comprising agglomerates which are 1) microencapsulated with a thermocurable wall material; 2) formed using a cationic dispersing agent; and 3) comprise a colorless or light-colored dye precursor, a color developer which reacts with the dye precursor upon heating to form a color, and a sensitizer and have an average diameter of 2–30 $\mu$m, said process comprising the following steps:

(1) grinding each of the dye precursor, the color developer and the sensitizer alone; or grinding separately the dye precursor and a mixture of the sensitizer and the color developer, or the color developer and a mixture of the sensitizer and the dye precursor, in the presence of an anionic dispersing agent until average particle diameter comes down to 0.5–1.0 $\mu$m, (2) mixing the resulting dispersions, (3) adding a cationic dispersing agent to the resulting mixture with stirring to form agglomerates having an average diameter of 2–30 $\mu$m and comprising the above three components, (4) adding the resulting agglomerates to an anionic protective colloid solution, and emulsifying or dispersing the agglomerates therein, and (5) adding a thermocurable resin as a wall forming material to the resulting emulsion or dispersion, wherein the resulting composition is subjected to heat-curing in order to perform microencapsulation of the agglomerates.

3. A process for producing a heat-sensitive recording composition comprising agglomerates which are 1) microencapsulated with a thermocurable wall material; 2) include an alkali metal salt or ammonium salt of a copolymer of maleic anhydride and a monomer copolymerizable therewith; and 3) comprise a colorless or light-colored precursor, a color developer which reacts with the dye precursor upon heating to form a color, and a sensitizer and have an average diameter of 2–30 $\mu$m, said process comprising the following steps:

(1) grinding each of the dye precursor, the color developer and the sensitizer alone; or grinding separately the dye precursor and a mixture of the sensitizer and the color developer, or the color developer and a mixture of the sensitizer and the dye precursor, in the presence of an anionic dispersing agent until average particle diameter comes down to 0.5–1.0 $\mu$m, (2) mixing the resulting dispersions, (3) adding to the resulting mixture an alkali metal salt or an ammonium salt of a copolymer of maleic anhydride and a monomer copolymerizable therewith with stirring to form an emulsion or dispersion containing agglomerates having an average diameter of 2–30 $\mu$m and comprising the above three components, and (4) adding a thermocurable resin as a wall forming material to the resulting emulsion or dispersion, wherein the resulting composition is subjected to heat-curing in order to perform microencapsulation of the agglomerates.

4. A process for producing a heat-sensitive recording composition comprising agglomerates which are 1) microencapsulated with a thermocurable wall material wherein the microcapsules further enclose a polymer in the form of a microemulsion having an average emulsified diameter of 0.2 $\mu$m or less; and 2) comprise a colorless or light-colored precursor, a color developer which reacts with the dye precursor upon heating to form a color, and a sensitizer and have an average diameter of 2–30 $\mu$m, said process comprising the following steps:

(1) grinding each of the dye precursor, the color developer and the sensitizer alone; or grinding separately the dye precursor and a mixture of the sensitizer and the color developer, or the color developer and a mixture of the sensitizer and the dye precursor, in the presence of an anionic dispersing agent until average particle diameter comes down to 0.5–1.0 $\mu$m, (2) mixing the resulting dispersions and then adding to the resulting mixture a microemulsion having an average diameter of 0.2 $\mu$m or less, (3) adding to the resulting mixture an alkali metal salt or an ammonium salt of a copolymer of maleic anhydride and a monomer copolymerizable therewith with stirring to form an emulsion or a dispersion containing agglomerates having an average particle diameter of 2–30 $\mu$m and comprising the above three components, and (4) adding a thermocurable resin as a wall forming material to the resulting emulsion or dispersion, wherein the resulting composition is subjected to heat-curing in order to perform microencapsulation of the agglomerates.

5. A process for producing a heat-sensitive recording composition comprising agglomerates which are 1) microencapsulated with a thermocurable wall material wherein the microcapsules further enclose a water-soluble polymer; and 2) comprise a colorless or light-colored dye precursor, a color developer which reacts with the dye precursor upon heating to form a color, and a sensitizer and have an average diameter of 2–30 $\mu$m, said process comprising the following steps:

(1) grinding each of the dye precursor, the color developer and the sensitizer alone; or grinding separately the dye precursor and a mixture of the sensitizer and the color developer, or the color developer and a mixture of the sensitizer and the dye precursor, in the presence of an anionic dispersing agent until average particle diameter comes down to 0.5–1.0 μm, (2) mixing the resulting dispersions and then adding a water-soluble polymer to the resulting mixture, (3) adding to the resulting mixture an alkali metal salt or an ammonium salt of a copolymer of maleic anhydride and a monomer copolymerizable therewith with stirring to form an emulsion or a dispersion containing agglomerates having an average diameter of 2–30 μm and comprising the above three components, and (4) adding a thermocurable resin as a wall forming material to the resulting emulsion or dispersion, wherein the resulting composition is subjected to heat-curing in order to perform microencapsulation of the agglomerates, with a proviso that an aqueous ammonia solution in an amount of 0.75–15.0 parts by weight (in terms of $NH_3$ content) based on 100 parts by weight of the components enclosed in the microcapsules is added in at least one of the above steps.

6. A heat-sensitive recording composition comprising agglomerates which comprise a colorless or light-colored dye precursor, a color developer which reacts with the dye precursor upon heating to form a color, and a sensitizer and have an average diameter of 2–30 μm.

7. A composition according to claim 6, wherein the agglomerates are formed using a cationic dispersing agent.

8. A composition according to claim 6, wherein the agglomerates are microencapsulated using a thermocurable wall material.

9. A composition according to claim 8, wherein the agglomerates are formed using a cationic dispersing agent.

10. A composition according to claim 8, wherein the agglomerates are formed using an alkali metal salt or ammonium salt of a copolymer of maleic anhydride and a monomer copolymerizable therewith.

11. A composition according to claim 8, wherein a polymer is further enclosed in the microcapsules.

12. A composition according to claim 11, wherein the polymer is in the form of a microemulsion having an average emulsified diameter of 0.2 μm or less.

13. A composition according to claim 11, wherein the polymer is water-soluble.

* * * * *